Figure 1:
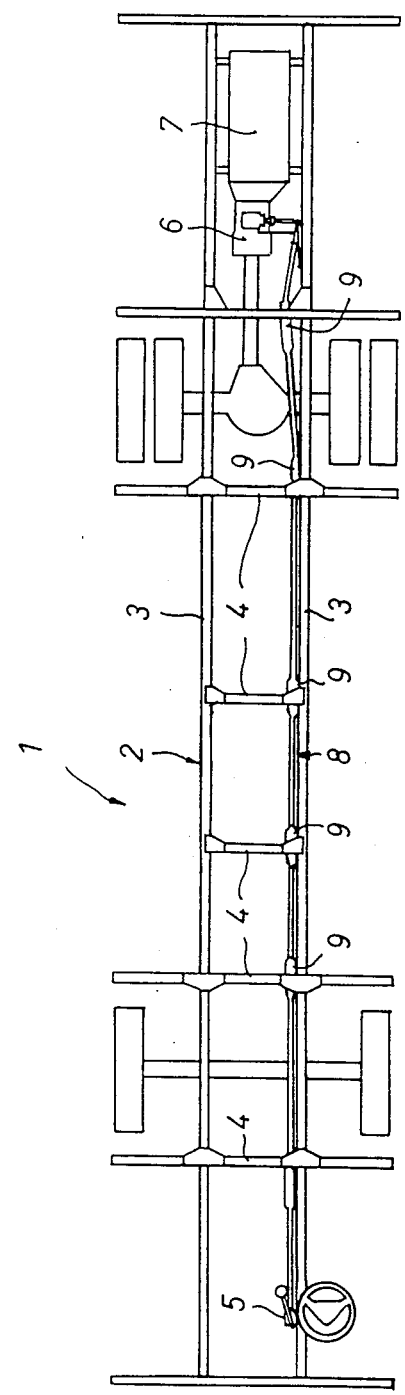

United States Patent [19]

Nilsson

[11] Patent Number: 4,582,161

[45] Date of Patent: Apr. 15, 1986

[54] REMOTE CONTROL ARRANGEMENT FOR A VEHICLE GEARBOX

[75] Inventor: Sven G. B. Nilsson, Katrineholm, Sweden

[73] Assignee: Saab-Scania Aktiebolag, Sodertalje, Sweden

[21] Appl. No.: 577,366

[22] Filed: Feb. 6, 1984

[30] Foreign Application Priority Data

Feb. 16, 1983 [SE] Sweden ................................ 8300842

[51] Int. Cl.$^4$ ............................................. B60K 20/12
[52] U.S. Cl. ..................................... 180/336; 192/4 A
[58] Field of Search ............. 180/336; 192/4 A, 53 C, 192/53 F, 114 T

[56] References Cited

U.S. PATENT DOCUMENTS 2,399,613  5/1946  Backus et al. .................. 180/336 X
2,694,943  11/1954  Brumbaugh .................... 180/336 X
3,978,739  9/1976  Hobbensiefken et al. ...... 180/336 X Primary Examiner—Henry Bennett
Attorney, Agent, or Firm—Cushman, Darby & Cushman

[57] ABSTRACT

In a remote control arrangement for a vehicle gearbox, the gearbox is mounted in a chassis frame and is controlled by a gear-change lever articulately connected, via a remote control rod, to a gear selection shaft on the gearbox. In a bus with rear-mounted engine and gearbox for example, such an arrangement includes a comparatively long remote control rod, usually mounted in the chassis frame. However, large relative movements between gearbox and chassis frame have caused disturbances in the control of the gearbox. This problem is solved by the gear selection shaft comprising two mutually articulatedly connected shafts, of which an outer shaft is connected via a spherical mounting to a support structure articulately attached to the chassis frame. Unintentional disengagement of an engaged gear is thus prevented.

11 Claims, 3 Drawing Figures

REMOTE CONTROL ARRANGEMENT FOR A VEHICLE GEARBOX

The present invention relates to a remote control arrangement for a gearbox in a vehicle, the gearbox being mounted in a chassis frame and being ontrolled by means of a gear-change level which is articulately connected via a remote control rod to a gear selection shaft on the gearbox.

In buses with a rear-mounted drive unit it is known to arrange mechanical remote control of the gearbox. A gear-change lever operable by the driver is in this case articulately connected to a remote control rod, the other end of which is articulately connected to the gearbox. In such an embodiment in the prior art, the remote control rod is connected via a transmission mechanism to a gear selection shaft included in the gearbox. By axial displacement and/or turning of the gear selection shaft, different gears are selected in the gearbox. The transmission mechanism includes a plurality of joints, levers and reaction struts, all of which are connected to the remote control rod and/or the gearbox. The transmission mechanism comprises no element which is connected to the vehicle frame or the like. As a result of this, the gearbox can be mounted flexibly, and such as to enable it to move relative the frame.

For buses with a rear-mounted drive unit, a relatively long remote control rod is required bewtween gear change level and gear box. This means that it cannot be connected directly between the gear change lever and the gearbox. Such a long control rod must be supported in a plurality of bearings, which are usually arranged on the vehicle frame. If the gearbox is mounted so that it can move relative the frame, this results in certain problems when road conditions are difficult. By the control rod being mounted in the frame, such relative movements may result in that the engaged gear can be disengaged unintentionally and/or that manual change of the gears is made difficult or is entirely prohibited. Such problems will be particularly noticeable in the large relative movements between frame and gearbox which can occur when driving over uneven ground.

The present invention has the object of eliminating this problem and relates to a remote control arrangement for remote control for a gearbox in a vehicle, the remote control rod being articulately attached to a lever rigidly attached to the gear selection shaft, there also being a lever rigidly attached to the remote control rod and connected to the gearbox via a reaction strut pivotable at both ends, for transmitting gear-changing movements.

The invention is essentially characterized in that the gear selection shaft comprises two mutually articulately connected shafts of which an outer shaft is connected via a spherical bearing to a support structure pivotably attached to the chassis frame, thereby preventing relative movements between the gearbox and chassis frame from affecting control of the gearbox.

The gear selection shaft is articulately disposed in the inventive arrangement, resulting in that no transverse forces on the gear selection shaft, due to relative movements between gearbox and chassis frame, are able to affect an engaged gear. The articulation of the gear selection shaft is enabled by its outer end being carried in a support structure.

Neither does the inventive arrangement allow, as a further advantage, any movements caused by the movements of the gearbox relative the chassis frame to be transferred from the gearbox to the gear-change lever. This results in that the latter will not vibrate, which is otherwise usual in known embodiments.

Figure 2:
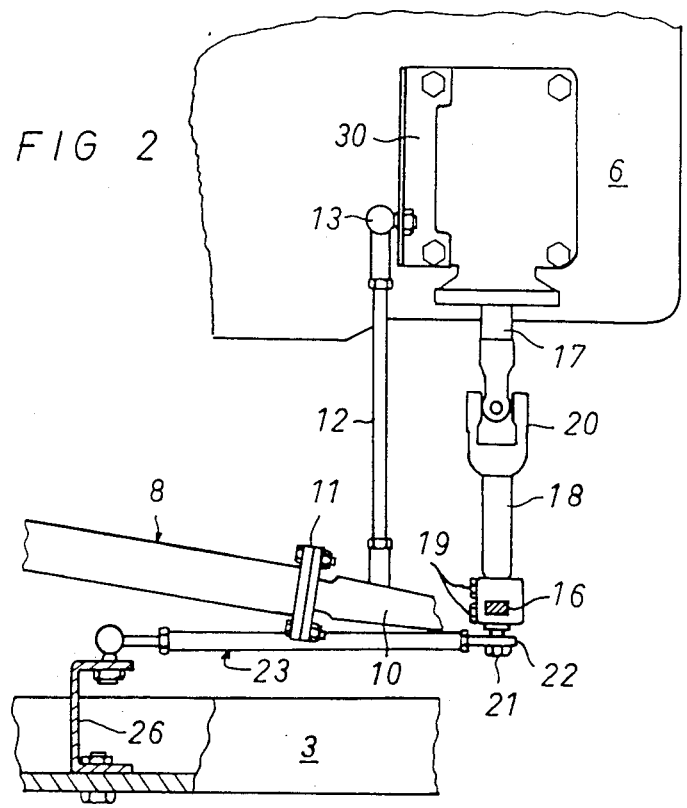
Figure 3:
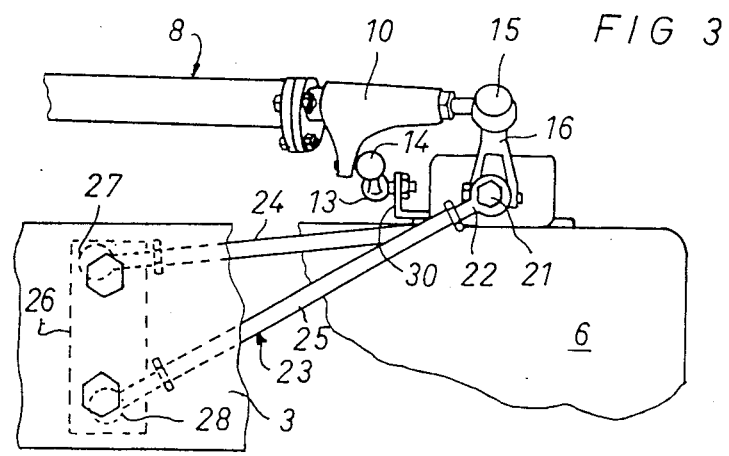

Other properties distinguishing the invention will be apparant from the following description of an arrangement exemplifying the invention, disposed in a bus. The description is carried out with reference to the accompanying drawings, on which FIG. 1 is a view from above illustrating the principal implementation of a bus chassis, FIG. 2 illustrates, in an enlarged partial view, rear end portions of the gear shifting means in the bus, and FIG. 3 is a side view of the gear shifting means according to FIG. 2.

A bus chassis 1 illustrated in FIG. 1 includes a chassis frame 2 substantially comprising two longitudinal stringer beams 3 and a plurality of transverse beams 4 rigidly attached to the stringer beams 3.

At the driver's station in the forward part of the bus chassis 1, a manually actuable gear-change lever 5 is arranged in a manner known per se. With the aid of the level 5, the driver can control a gearbox 6 flexibly mounted in the chassis frame 2 at the rear portion of the bus. The gearbox 6 is attached to a longitudinally mounted dirving engine 7, also flexibly mounted on the chassis frame 2, and together with the gearbox 6 forms a rearmounted drive unit in the bus chassis.

The gear-change lever 5 is connected to the gearbox 6 via a remote control rod 8 disposed along the length of the bus chassis 1. The gear-change lever 5 is conventionally mounted on the chassis 1, and its lower part is articulately connected to one end of the remote control rod 8. By operating the lever 5, the remote control rod 8 may be given both turning movements and axial displacing movements.

The remote control rod 8 comprises a plurality of rods attached to each other by a plurality of universal joints 9. Such an articulated implementation permits certain springing movements in the chassis frame 2. At the rear end of the bus chassis 1, the remote control rod is connected to the gearbox 6 via an inventive arrangement, which is apparent from the accompanying FIGS. 2 and 3.

A lever 10 is rigidly connected to the rear end of the control rod 8 with the aid of a flanged, bolted joint 11. The outer end of the lever 10 is connected to one end of a strut 12, the other end of which is mounted on a bracket 30 attached to the gearbox 6. The strut 12 is intended to act as a reaction strut, and for this reason it is attached by ball joints 13,14 to both the lever 10 and to the bracket 30 attached to the gearbox 6.

At the rear end of the lever 10, along an extension of the centreline of the control rod 8, there is attached a joint head 15 which is articulately connected with the aid of a spherical mounting to the outer end of a lever 16 on a gear selection shaft 17,18 connected to the gearbox 6. In FIG. 3, the lever 10 attached to the control rod 8 is illustrated in its entirety, but in FIG. 2 it is partly cut away, better to illustrate other coacting parts. The lever 16 connected to the joint head 15 is preferably bifurcated such as to accommodate the gear selection shaft 17,18 coming from the gearbox 6. The lever 16 is rigidly attached to the gear selection shaft 17,18 with the aid of two bolts 19 transcerse to the shaft.

The gear selection shaft 17,18 is oriented substantially transverse in the bus chassis 1, and cooperates in the gearbox 6 with conventional means (not shown) in selecting and engaging different gears.

In accordance with the invention, the gear selection shaft 17,18 comprises an inner shaft 17 and an outer intermediate shaft 18 mutually connected via a universal joint 20. The intermediate shaft 18 is connected to a joint head 22 with the aid of a screw 21 threaded into the shaft end. The joint head 22 has spherical bearing and constitutes an articulatible connection means at a corner of a substantially triangular support structure 23. This is formed by two supporting arms 24,25 welded together where they meet at a corner, and at their free ends being attached by ball-and-socket joints 27,28, respectively, to a bracket 26 bolted to one stringer beam 3. The support structure 23 is oriented substantially parallel to the stringer beams 3.

Gear changing in the gearbox 6 takes place by actuating the gear-change lever 5, the operation movement being transferred as an axial displacement and/or turning movement of the remote control rod 8. For an axial displacement of the rod 8, the gear selection shaft 17,18 on the gearbox will be caused to turn, since its outer end is fixed in the longitudinal direction of the bus chassis 1 by the support structure 23. The displacing movement of the rod 8 thus acts, via the lever 16, to turn the gear selection shaft 17,18. The reaction strut 12 attached to the lever 10 accompanies the displacement of the rod 8 and will not take up any forces.

When the remote control rod 8 is turned, the reaction strut 12 will be subjected either to a compression force or a tensile force, depending on the direction of turn. The fixed length of the reaction strut 12 results in that the rear end of the rod 8, via the joint head 15, gives the lever 16 a displacing movement in the transverse direction of the bus chassis 1, this movement being transferred to the gear selection shaft 17,18 since the lever 16 is rigidly attached to it.

The articulated connection between the gear selection shaft 8 and the support structure 23 via the joint head 22, and the articulated attachment of the support structure 23 to the chassis frame 2 permits the support structure 23 to swivel about its two connections to the chassis frame 2 and about its connection to the gear selection shaft 17,18.

For relative movements between the gearbox 6 and the chassis frame 2, the universal joint 20 of the gear selection shaft 17,18 will allow angular deviations between the two parts of the shaft 17,18 and thus no undesired forces can act on the shaft 17,18 to affect gear selection.

Within the scope of the following claims, the invention can be modified into alternative embodiments. Thus the exemplified attachment of the support structure 23 by ball joints 27,28 may be modified with an attachment including a pivot shaft. To advantage, this pivot shaft is oriented in a vertical plane parallel to the stringer beams 3 of the bus chassis 1.

The attachments of the support structure 23 to the chassis frame 2 and/or the gear selection shaft 17,18 are preferably implemented such as go give resilience, e.g. with the aid of rubber bushings. This results in that vibrations are not as easily transferred from the gearbox 6 to the chassis frame 2. This also allows the support structure 23 better to follow axial movements of the gear selection shaft 17,18.

What I claim is:

1. A remote control arrangement for a gearbox in a vehicle, said gearbox being mounted in a chassis frame and being controlled by means of a gear-change lever which is, via a remote longitudinal control rod, articulately connected to a transverse gear selection shaft on the gearbox, the control rod being articulately attached to a lever rigidly attached to the gear selection shaft, there also being a lever rigidly attached to the remote control rod and connected to the gearbox via a reaction strut pivotable at both ends, for transferring gear-changing movements, characterized in that the transverse gear selection shaft comprises two mutually articulately connected first and second shafts, of which the first shaft is connected via a spherical bearing to a support structure articulately attached to the chassis frame, the support structure longitudinally positioning the outer shaft, thereby preventing relative movements between the gearbox and chassis frame from affecting control of the gearbox.

2. A gearbox shift control mechanism including a gear shift actuator and a gearbox each mounted on a vehicle chassis frame, the gear shift actuator connected to a remote control rod situated longitudinally to the frame, the gearbox having a gear selection shaft situated transverse to the frame, said gear selection shaft having a first lever fixed thereto and articulately connected to said remote control rod for selectively changing gears, a support structure articulately attached to the frame and pivotally connected to the transverse gear selection shaft thereby preventing relative movements between the gearbox and frame from affecting control of the gearbox.

3. A gearbox shift control mechanism including a gear shift actuator and a gearbox each mounted on a vehicle chassis frame, the gears shift actuator being connected to a remote control rod situated longitudinally to the frame, the gearbox having a gear selection shaft situated transversely to the frame, said gear selection shaft having a first level fixed thereto and articulately connected to said control rod for selectively changing gears, a second lever fixed to the control rod and pivotally connected to a reaction strut, said strut being pivotally connected to the gearbox, a support structure articulately attached to the frame and pivotally connected to the gear selection shaft thereby preventing relative movements between the gearbox and frame from affecting control of the gearbox.

4. A gearbox shift control arrangement including a gear shift actuator and a gearbox each mounted on a vehicle chassis frame, the gear shift actuator being connected to a remote control rod situated longitudinally to the frame, the gearbox having a gear selection shaft situated transversely to the frame, said gear selection shaft having a first lever fixed thereto and articulately connected to said control rod for selectively changing gears, a second lever fixed to the control rod and pivotally connected to a reaction strut, one end of said strut being pivotally connected to the gearbox, the gear selection shaft comprising first and second articulately connected shafts, the first shaft being pivotally connected to a support structure, the second shaft being connected to the gearbox, the support structure comprising a pair of rigidly interconnected support arms each pivotally connected to the frame.

5. An arrangement as claimed in claim 1, characterized in that the support structure comprises two support arms which are rigidly attached to each other and which at one of their respective ends are connected to each other and to the gear selection shaft, their respective other ends being connected to the chassis frame via ball joints.

6. An arrangement as claimed in claim 1, characterized in that the two shafts constituting the gear selection shaft are mutually connected by a universal joint.

7. The arrangement according to claim 4 wherein the support arms are essentially parallel to the frame.

8. The arrangement according to claim 4 wherein the support arms are situated one vertically above the other.

9. The arrangement according to claim 6 wherein the support arms are connected to the frame by ball joints.

10. The arrangement according to claim 6 wherein the first shaft is connected to the support structure by a ball joint.

11. The arrangement according to claim 6 wherein the support arms are pivotally connected to the frame about a vertical axis.

* * * * *